Jan. 13, 1942.  B. M. HYMAN  2,269,976
DRAFT ELEMENT
Filed Feb. 10, 1941

Inventor
Benjamin M. Hyman
By Paul O. Pippel
Att'y.

Patented Jan. 13, 1942

2,269,976

UNITED STATES PATENT OFFICE 2,269,976

DRAFT ELEMENT

Benjamin M. Hyman, Moline, Ill., assignor to International Harvester Company, a corporation of New Jersey Application February 10, 1941, Serial No. 378,237

3 Claims. (Cl. 280—33.44)

This invention relates to a draft element. More specifically it relates to a foldable draft element for pulling a wagon behind a tractor.

It is known to pull a wagon behind a tractor upon which is mounted a corn picker, the wagon receiving corn from the picker and in most cases it becomes necessary to adjust the position of the wagon in a longitudinal direction with respect to the tractor. This may be accomplished by means of a foldable wagon tongue and the present invention relates to such a wagon tongue.

An object of the present invention is to provide an improved draft element.

A further object is the provision of an improved draft element which may be folded.

Another object is to provide a wagon tongue which may be folded so that the wagon may be attached to a tractor by means of the end of the tongue or by means of the portion of the tongue adjacent the folding joint thereof.

According to the present invention a wagon tongue is made in two sections pivotally connected to one another with side plates secured to the rear section of the tongue. The tongue may be used with the sections in line and draft means such as the tractor connected to the forward end of the front section or with the sections extending along one side of one another and a draft means connected to the side plates.

Figure 1:
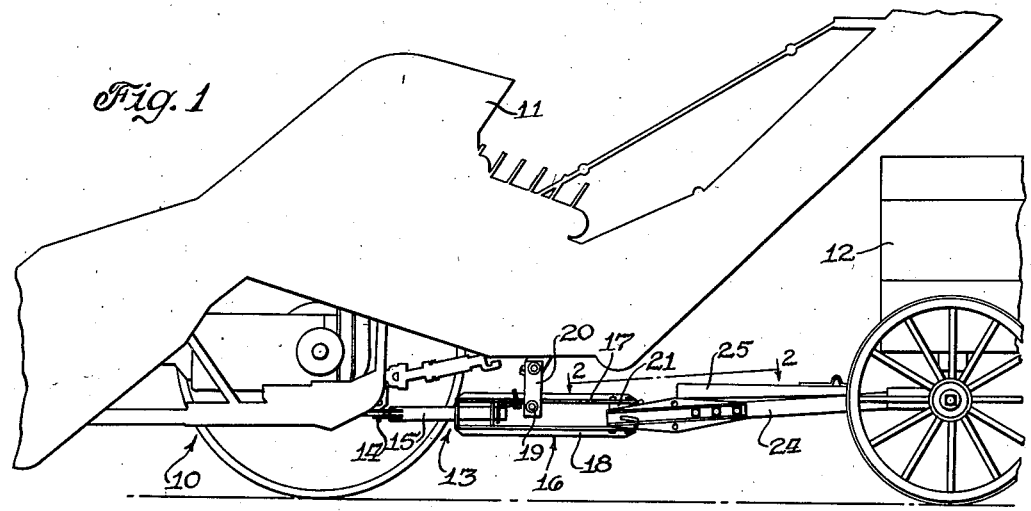
Figure 1 is a side view of portions of a tractor, a corn picker mounted thereon, and a wagon with the novel draft element of the present invention connecting the wagon to the tractor.
Figures 2, 3:
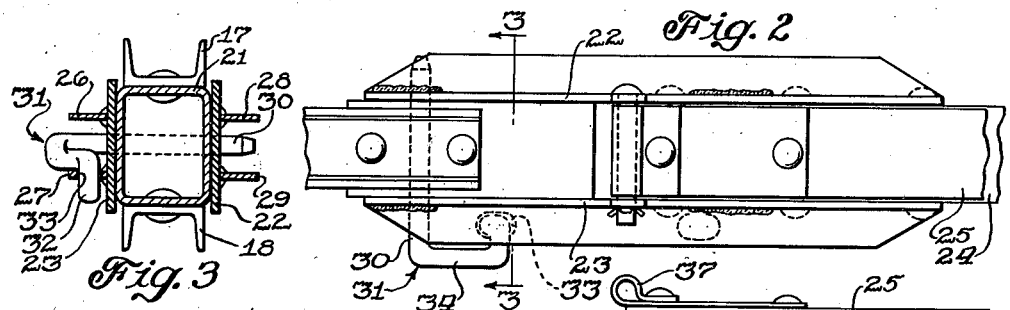
Figure 2 is a plan view of a portion of the wagon tongue in folded position and of the tractor draw-bar as shown on lines 2—2 in Figure 1.
Figure 3 is a sectional view taken along the lines 3—3 of Figure 2.

The reference character 10 denotes a tractor upon which is pivotally mounted a corn picker 11 and behind which is connected a wagon 12. The mounting of the picker upon the tractor is shown in detail and claimed in co-pending application to B. M. Hyman et al., Serial No. 210,464, filed May 27, 1938. A swinging draw-bar 13 is pivotally connected at 14 at the rear of the tractor. The draw-bar is composed of a forward section 15 and a rearward section 16 slidably associated therewith. The rearward section 16 is formed of upper and lower members 17 and 18. The upper member 17 passes over a tubular member 19 connected beneath the rearward end of the picker 11 by means of side elements 20, of which only one is shown. The rear end of the members 17 and 18 have secured between them a hollow draft head 21. As shown in Figures 1, 2, and 3, this hollow draft head is embraced by side plates 22 and 23 secured to a rear section 24 of a folding wagon tongue having as its forward part the section 25. Ribs 26, 27, 28, and 29 are secured as by welding or soldering to the side plates 22 and 23. As seen in Figures 2 and 3, a portion 30 of a pin 31 extends through openings in the side plates 22 and 23 and the hollow draft head 21, and a portion 32 extends through an opening 33 in the plate 27 so as to hold the pin 31 locked against movement. A portion 34 joins the portions 30 and 32. In this way the pin 31 serves to join the wagon tongue to the swinging draw-bar 13 with the wagon tongue in its folded position and the wagon 12 close to the tractor. Because of the swinging of the wagon tongue 13 about the pivotal connection 14 there is considerable bending stresses exerted upon the side plates 22 and 23 which connect rear sections 24 of the wagon tongue to the hollow draft head 21. The ribs 26, 27, 28, and 29 serve to stiffen the side plate members 22 and 23 against bending, and the rib 27 serves additionally by the hole 33 to lock the pin 31 against displacement.

Figures 4, 5, 6, 7:
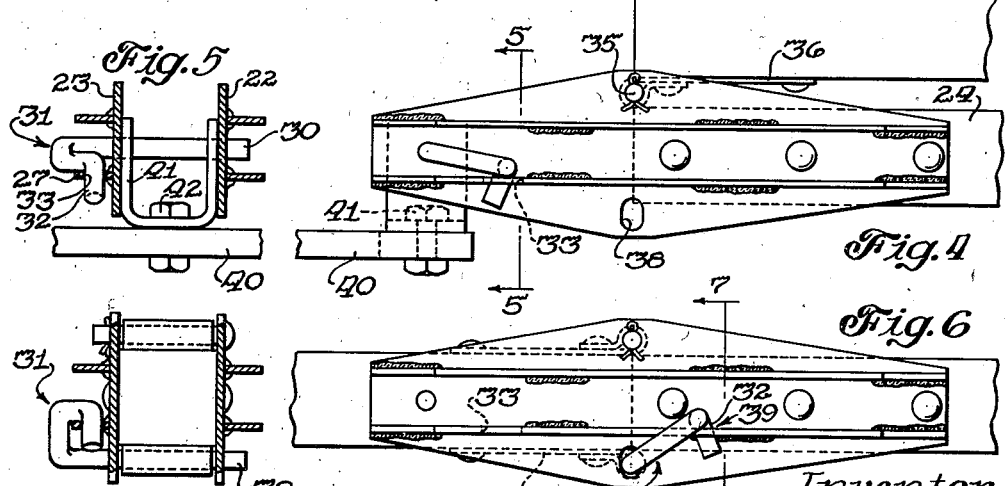
Figure 4 is a side view of the wagon tongue in folded position attached to a tractor draw-bar.
Figure 5 is a sectional view taken along the line 5—5 of Figure 4.
Figure 6 is a side view of the wagon tongue with the sections thereof extending in line with one another.
Figure 7 is a sectional view taken along the line 7—7 of Figure 6.

The section 25 of the wagon tongue is connected to the section 24 by means of a pivot bolt 35 which passes through side plates 22 and 23 and through a bracket member 36 connected to the under side of the section 25 as viewed in Figure 4. When the sections 24 and 25 are in line the bracket 36 is on the upper side of the section 25. A second bracket 37 secured to the lower side of the section 25 in this position has extending through it the portions 30 of the pin 31 and also through openings in the side plates 22 and 23 of which only an opening 38 in the side plate 23 is shown. The portion 32 of the pin 31 extends through an opening 39 in the rib 27, and thereby the pin 31 is locked against displacement.

Figures 5 and 6 show the wagon tongue secured to a draw-bar 40 which may be of U-shape and secured to the tractor so as to have no movement with respect thereto. A U-shaped member 41 is secured to the draw-bar 40 by means of a bolt 42. The side plates 22 and 23 embrace the legs of the U-shaped member 41 and the pin 31 secures the plate members to the U-shaped member with the portions 30 passing therethrough and its portions 32 extending through the opening 33 in the rib 27.

It will be apparent from the foregoing description that a new and novel draft element or wagon tongue structure has been provided which is composed of foldable sections. In the folded position of the wagon tongue a pin passes through side members secured to the rear sections of the wagon tongue and through a member secured to a draw-bar of a tractor. A portion of the pin extends through an opening in a stiffening rib secured to one side plate member, and thereby the pin is held against displacement. In a position in which the sections of the wagon tongue extend in longitudinal alignment, the same pin which is secured to the side plates to the tractor draw-bar now extends through the side plates at a different point and also through a bracket secured to the forward section of the wagon tongue so as to hold the sections of the tongue in alignment. All the ribs secured to the outside of the side plates serve to stiffen the plates against bending due to side thrust, and one rib serves additionally to lock the securing pin against displacement, since a portion of the securing pin may pass through one of the two holes in the rib.

The intention is to limit the invention only within the scope of the appended claims.

What is claimed is:

1. A foldable draft element comprising first and second sections pivotally connected to one another for relative movement about a pivot axis along one side transverse to the length of the section, plates secured to opposite sides of the first section and extending therebeyond in planes transverse to the pivot axis, one of the plates having a stiffening rib extending parallel to the sections, and a pin having one portion adapted to extend through the plates at one point and to engage the end of the second section at the side opposite the pivot axis so as to hold the sections in line and having a second portion engaging the stiffening rib, the pin also being adapted to extend through the plates at another point beyond the end of the first section and to engage a draft device embraced by the plates, the second section extending alongside the first section.

2. A foldable draft element comprising first and second sections pivotally connected to one another for relative movement about a pivot axis along one side transverse to the length of the sections, a plate secured to one side of the first section and extending therebeyond transverse to the pivot axis of the sections, the plate having an outwardly extending stiffening rib, and a pin having one portion adapted to extend through the plate at one point and to engage the end of the second section at the side opposite the pivot axis so as to hold the sections in line, said pin having a second portion extending at an angle to the first portion and adapted to engage the stiffening rib so as to hold the first portion against displacement from the plate, the first portion of the pin also being adapted to extend through the plate at another point beyond the end of the first section and to engage a draft device with the second portion of the pin engaging the stiffening rib to prevent displacement of the first portion from the plate.

3. A foldable draft element as specified in claim 2, the first portion of the pin being adapted to engage the said second section by passing through openings therein, and the second portion of the pin being adapted to engage the stiffening rib by passing through openings therein.

BENJAMIN M. HYMAN.